(12) United States Patent
Jung et al.

(10) Patent No.: US 11,901,538 B2
(45) Date of Patent: Feb. 13, 2024

(54) SODIUM SECONDARY BATTERY MODULE

(71) Applicant: RESEARCH INSTITUTE OF INDUSTRIAL SCIENCE & TECHNOLOGY, Pohang-si (KR)

(72) Inventors: Keeyoung Jung, Pohang-si (KR); Choong-Mo Yang, Seoul (KR); Hyeon-Woo Kim, Pohang-si (KR); Yoon-Cheol Park, Busan (KR); Sori Son, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 375 days.

(21) Appl. No.: 17/278,795

(22) PCT Filed: Nov. 30, 2018

(86) PCT No.: PCT/KR2018/015106
§ 371 (c)(1),
(2) Date: Mar. 23, 2021

(87) PCT Pub. No.: WO2020/067606
PCT Pub. Date: Apr. 2, 2020

(65) Prior Publication Data
US 2022/0029223 A1  Jan. 27, 2022

(30) Foreign Application Priority Data
Sep. 27, 2018 (KR) .......................... 10-2018-0114667

(51) Int. Cl.
*H01M 10/6571* (2014.01)
*H01M 10/613* (2014.01)
(Continued)

(52) U.S. Cl.
CPC ..... *H01M 10/6571* (2015.04); *H01M 10/054* (2013.01); *H01M 10/0585* (2013.01);
(Continued)

(58) Field of Classification Search
CPC ........... H01M 10/6571; H01M 10/054; H01M 10/0585; H01M 10/613; H01M 10/615;
(Continued)

(56) References Cited

U.S. PATENT DOCUMENTS

| 5,393,617 A * | 2/1995 | Klein | ...................... H01M 4/24 |
| | | | 429/153 |
| 5,409,787 A * | 4/1995 | Blanyer | ................ H01M 10/16 |
| | | | 29/623.2 |

(Continued)

FOREIGN PATENT DOCUMENTS

| CN | 101026232 A | 8/2007 |
| CN | 102054952 A | 5/2011 |

(Continued)

OTHER PUBLICATIONS

Office Action fm corresponding Japanese Appiication No. 2021-515447 dated Apr. 12, 2022.

(Continued)

*Primary Examiner* — Matthew J Merkling
(74) *Attorney, Agent, or Firm* — Renner, Otto, Boisselle & Sklar, LLP

(57) ABSTRACT

A sodium secondary battery module, according to an exemplary embodiment of the present invention, may comprise: unit stacks in which a plurality of unit cells are laminated, the plurality of unit cells each having an upper cap and a lower cap which seal up a plate-shaped solid electrolyte and a positive electrode component and a negative electrode component which are plate-shaped and respectively disposed on two sides of the solid electrolyte; separators which (Continued)

are interposed between the unit stacks while the plurality of unit stacks are arranged in columns and rows, so as to separate spaces between the unit stacks; and a case for accommodating the plurality of unit stacks and the separators.

11 Claims, 12 Drawing Sheets

(51) Int. Cl.
| | |
|---|---|
| *H01M 10/615* | (2014.01) |
| *H01M 10/647* | (2014.01) |
| *H01M 10/658* | (2014.01) |
| *H01M 50/262* | (2021.01) |
| *H01M 50/209* | (2021.01) |
| *H01M 10/054* | (2010.01) |
| *H01M 10/0585* | (2010.01) |
| *H01M 50/50* | (2021.01) |
| *H01M 50/264* | (2021.01) |
| *H01M 50/271* | (2021.01) |
| *H01M 50/291* | (2021.01) |
| *H01M 50/503* | (2021.01) |
| *H01M 50/216* | (2021.01) |

(52) U.S. Cl.
CPC ....... *H01M 10/613* (2015.04); *H01M 10/615* (2015.04); *H01M 10/647* (2015.04); *H01M 10/658* (2015.04); *H01M 50/209* (2021.01); *H01M 50/216* (2021.01); *H01M 50/262* (2021.01); *H01M 50/264* (2021.01); *H01M 50/271* (2021.01); *H01M 50/291* (2021.01); *H01M 50/50* (2021.01); *H01M 50/503* (2021.01)

(58) Field of Classification Search
CPC ............. H01M 10/647; H01M 10/658; H01M 50/209; H01M 50/216; H01M 50/262; H01M 50/264; H01M 50/271; H01M 50/291; H01M 50/50; H01M 50/503; H01M 10/0422; H01M 10/0468; H01M 10/0481; H01M 10/0562; H01M 10/6555; H01M 10/0463; H01M 10/6557; H01M 10/6563; H01M 50/204; H01M 50/213; H01M 50/293; H01M 50/20; H01M 10/6562; H01M 2220/10; H01M 50/24; Y02E 60/10; Y02P 70/50

See application file for complete search history.

(56) References Cited

U.S. PATENT DOCUMENTS

| | | | | |
|---|---|---|---|---|
| 5,670,272 | A | * | 9/1997 | Cheu ..................... H01M 4/382 |
| | | | | 429/162 |
| 2005/0136294 | A1 | | 6/2005 | Tsunoda |
| 2005/0221146 | A1 | | 10/2005 | Horiguchi |
| 2007/0037052 | A1 | * | 2/2007 | Jeon .................. H01M 10/0413 |
| | | | | 429/152 |
| 2007/0194753 | A1 | | 8/2007 | Sumida et al. |
| 2010/0119929 | A1 | | 5/2010 | Gaben et al. |
| 2012/0021260 | A1 | | 1/2012 | Yasui et al. |
| 2012/0064388 | A1 | | 3/2012 | Whitacre et al. |
| 2012/0148890 | A1 | | 6/2012 | Goto et al. |
| 2012/0315566 | A1 | | 12/2012 | Schaefer et al. |
| 2016/0013526 | A1 | * | 1/2016 | Uchiyama ............. H01M 50/24 |
| | | | | 429/71 |
| 2018/0062223 | A1 | * | 3/2018 | Murata ............. H01M 10/6571 |
| 2018/0277906 | A1 | * | 9/2018 | Yoshima ............. H01M 50/249 |

FOREIGN PATENT DOCUMENTS

| | | | | |
|---|---|---|---|---|
| CN | 102725879 A | | 10/2012 | |
| CN | 103840232 A | | 6/2014 | |
| CN | 104716285 A | | 6/2015 | |
| CN | 204375813 U | | 6/2015 | |
| CN | 105761941 A | | 7/2016 | |
| CN | 206639869 U | | 11/2017 | |
| CN | 108574073 A | | 9/2018 | |
| EP | 0613201 B1 | * | 8/1998 | |
| JP | H10-040952 A | | 2/1998 | |
| JP | H10-294128 A | | 11/1998 | |
| JP | 2001-229960 A | | 8/2001 | |
| JP | 2002-260724 A | | 9/2002 | |
| JP | H06333591 A | * | 12/2002 | ............ H01M 10/04 |
| JP | 2003-068356 A | | 3/2003 | |
| JP | 2004-362879 A | | 12/2004 | |
| JP | 2005-149775 A | | 6/2005 | |
| JP | 2005-183079 A | | 7/2005 | |
| JP | 2005-285685 A | | 10/2005 | |
| JP | 2006-049024 A | | 2/2006 | |
| JP | 2006-196230 A | | 7/2006 | |
| JP | 2007-018752 A | | 1/2007 | |
| JP | 2009134900 A | * | 6/2009 | .......... H01M 10/613 |
| JP | 2009-163932 A | | 7/2009 | |
| JP | 2012/122353 A2 | | 9/2012 | |
| JP | 2012-248374 A | | 12/2012 | |
| JP | 2014-192094 A | | 10/2014 | |
| JP | 2014-216299 A | | 11/2014 | |
| JP | 2018-125142 A | | 8/2018 | |
| KR | 10-0897179 B1 | | 5/2009 | |
| KR | 10-2010-0016371 A | | 2/2010 | |
| KR | 10-2011-0118807 A | | 11/2011 | |
| KR | 10-1334534 B1 | | 12/2013 | |
| KR | 10-1550891 B1 | | 9/2015 | |
| KR | 10-1823873 B1 | | 1/2018 | |
| KR | 10-2018-0093250 A | | 8/2018 | |
| WO | WO-2012164723 A1 | * | 12/2012 | ............ H01M 10/04 |

OTHER PUBLICATIONS

Original and English Translation of the First Chinese Office Action issued for corresponding Chinese Application No. 201880097936.7, dated Aug. 4, 2022.

* cited by examiner

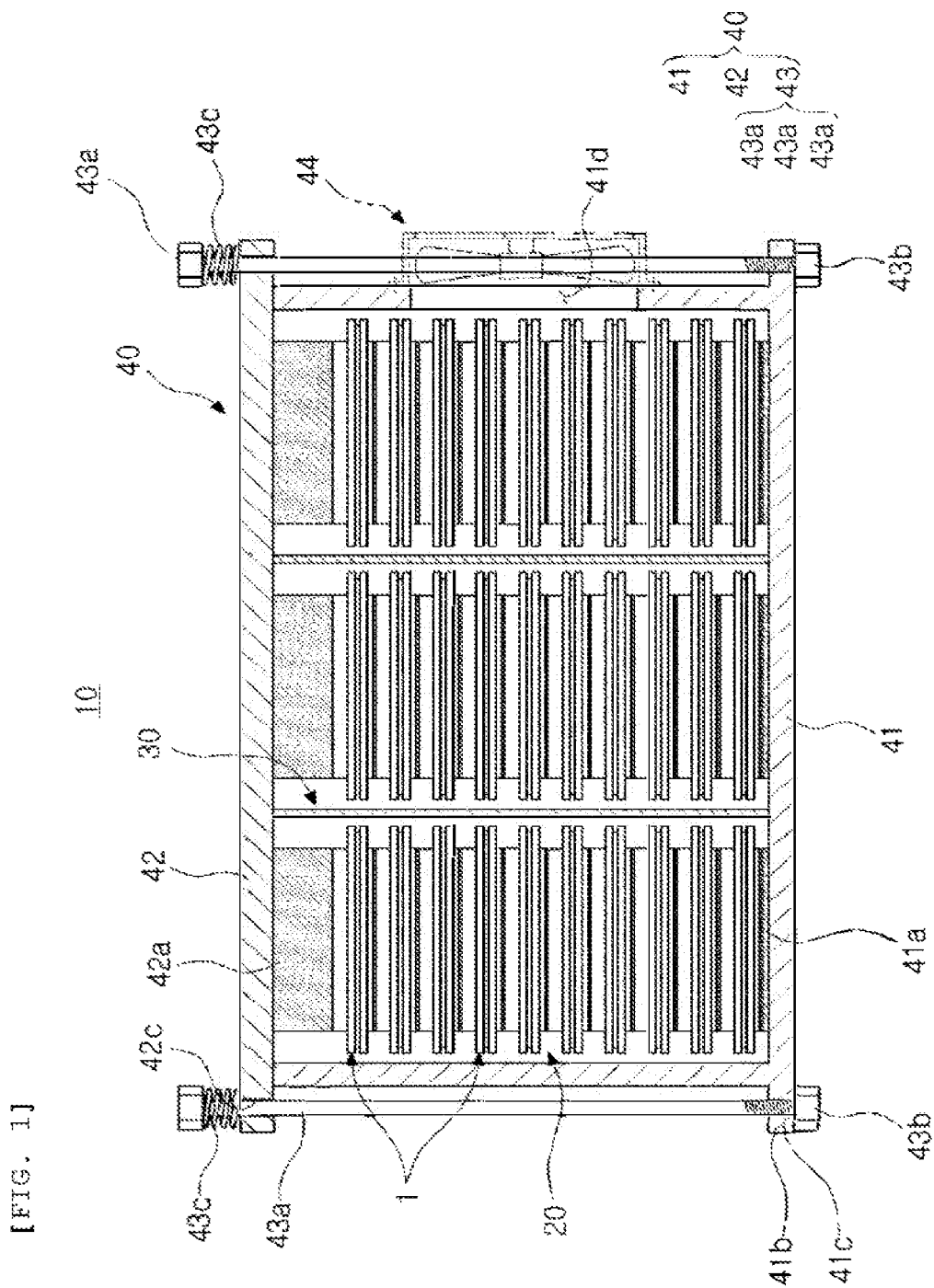
[FIG. 1]

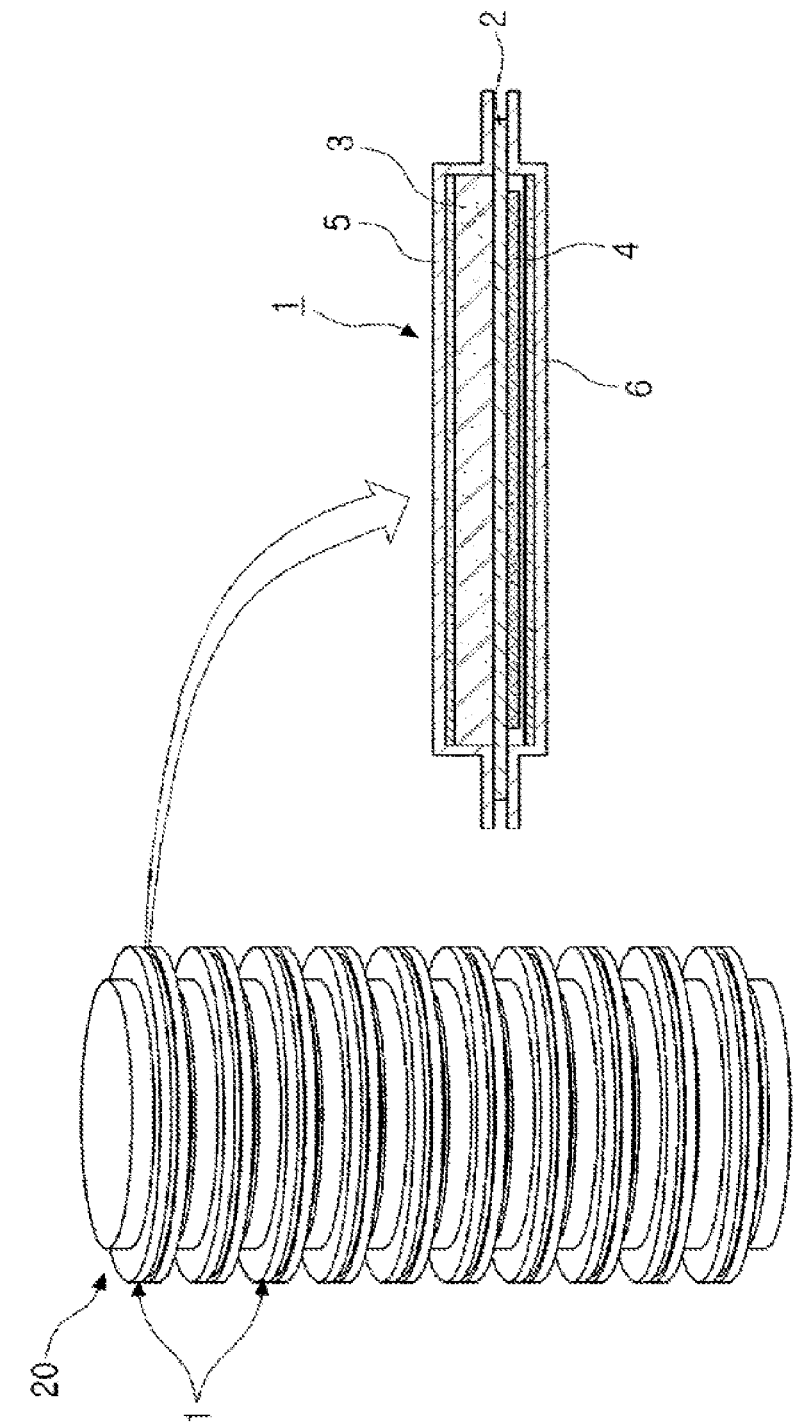

[FIG. 3]
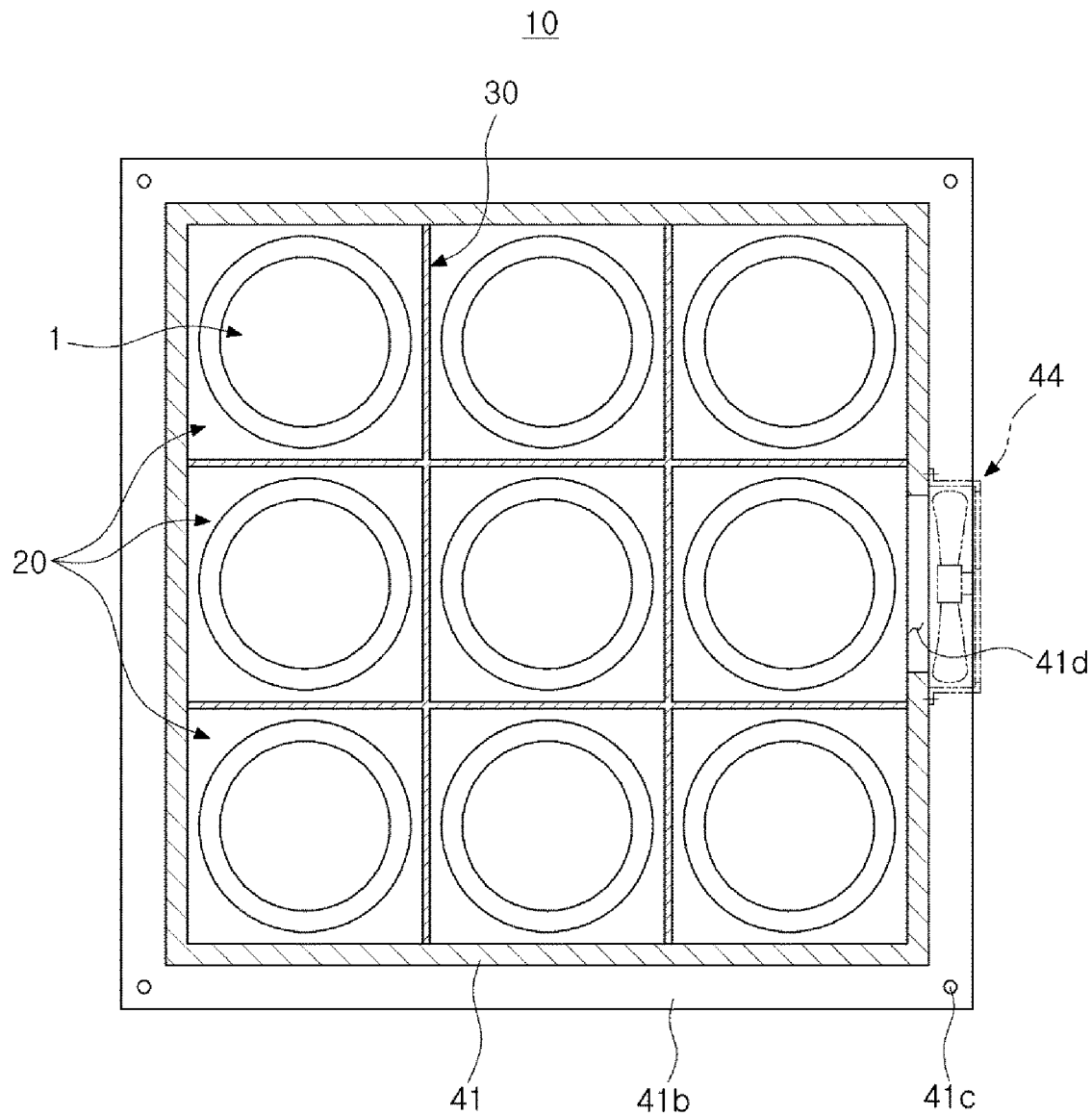

[FIG. 4A]
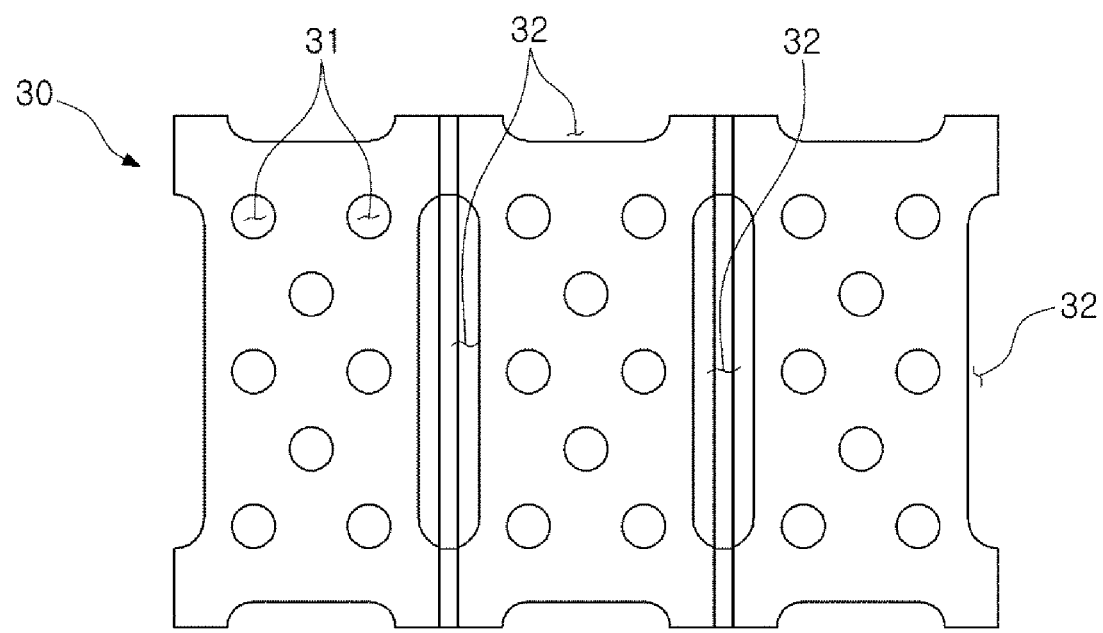

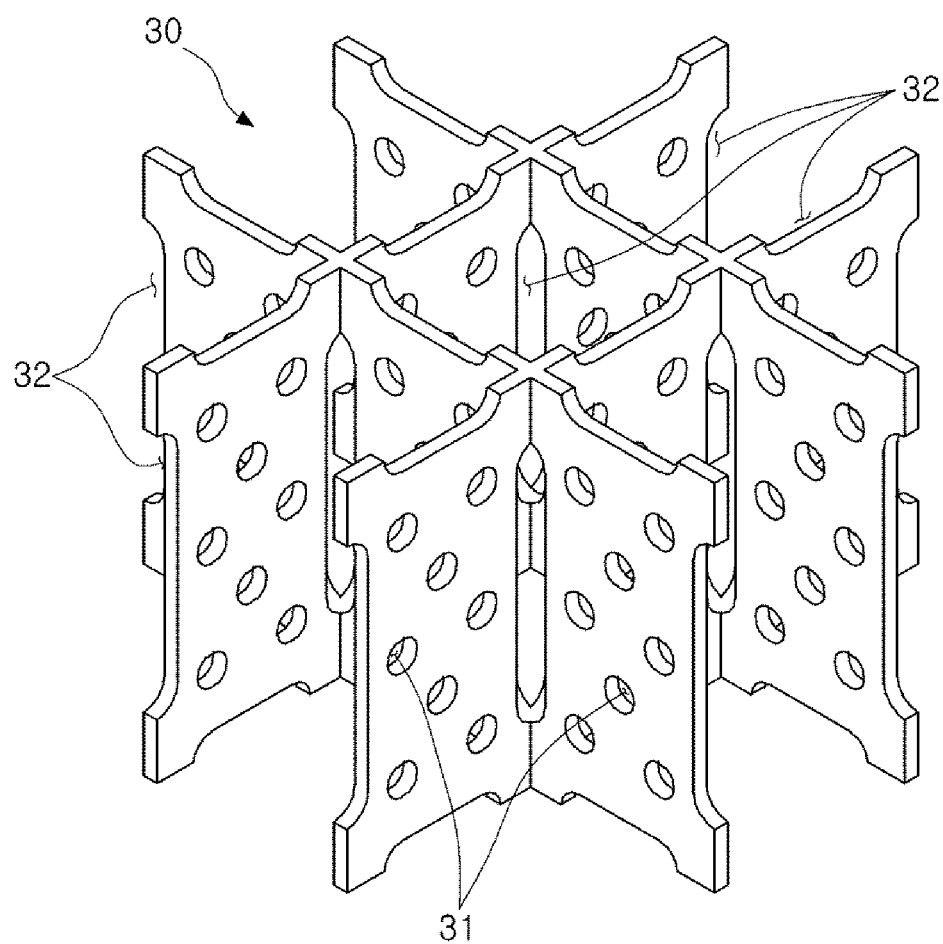
[FIG. 4B]

[FIG. 5]
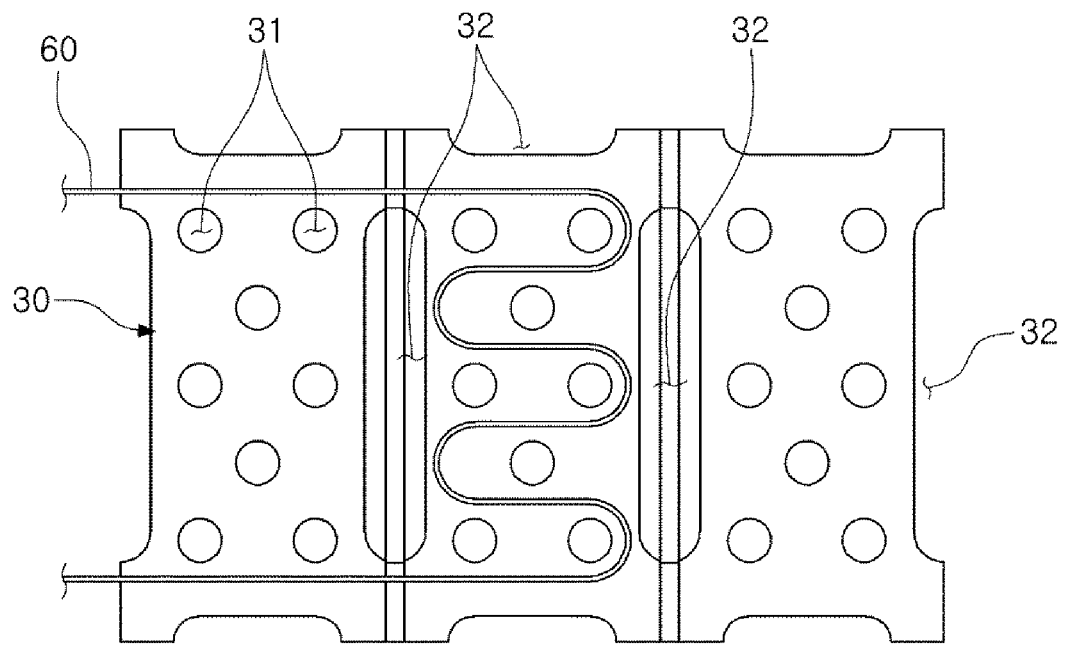

[FIG. 6A]
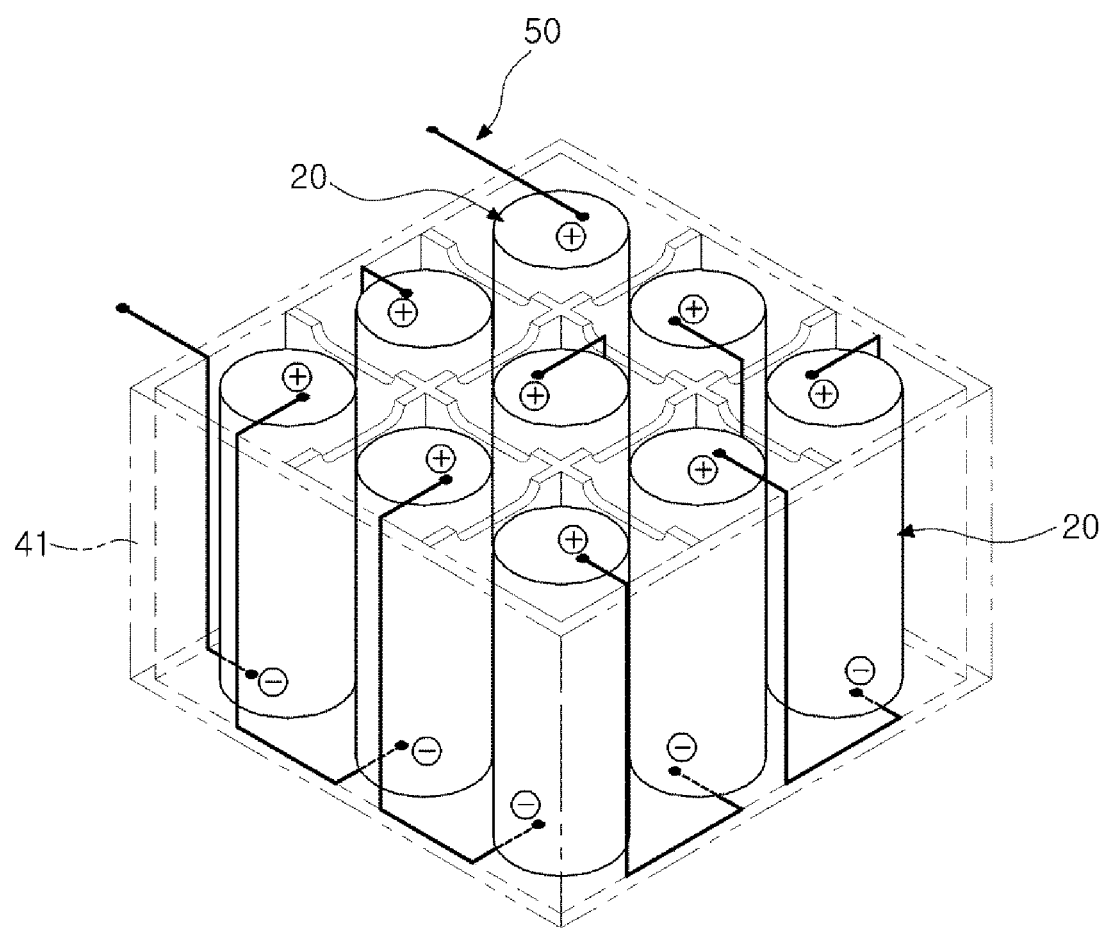

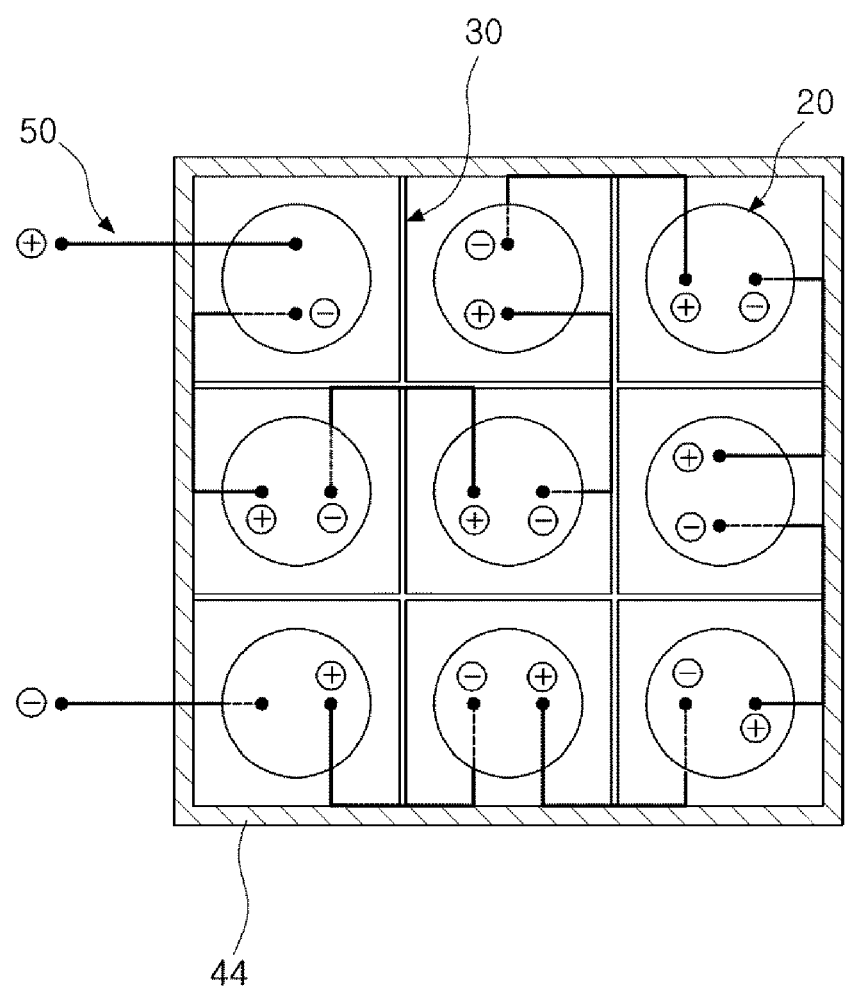
【FIG. 6B】

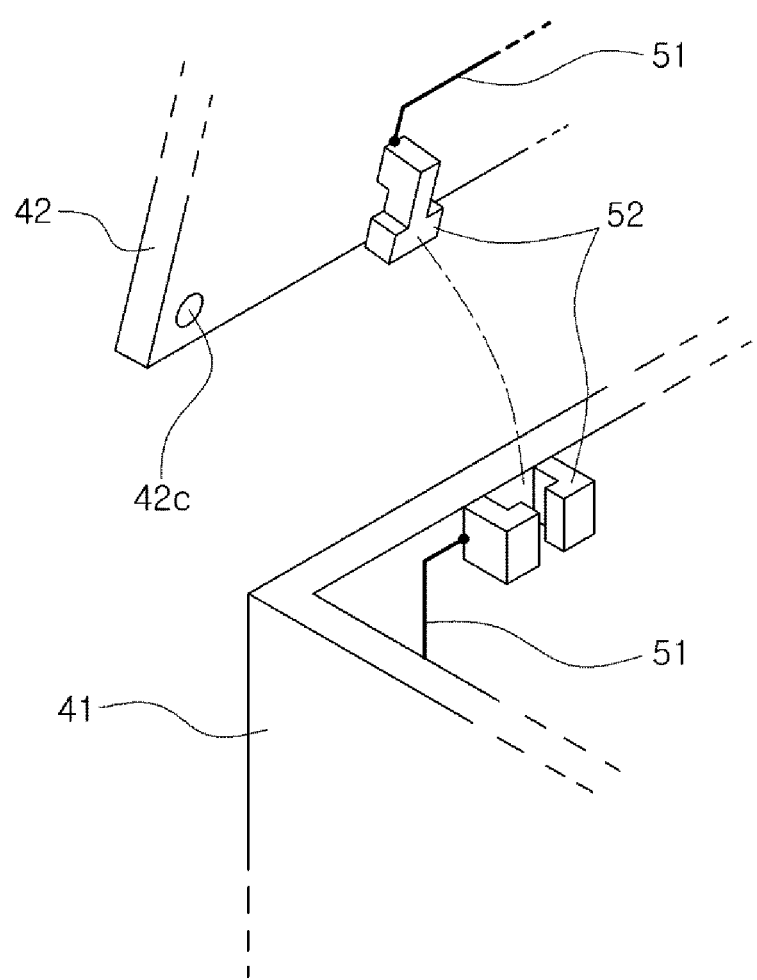
[FIG. 7A]

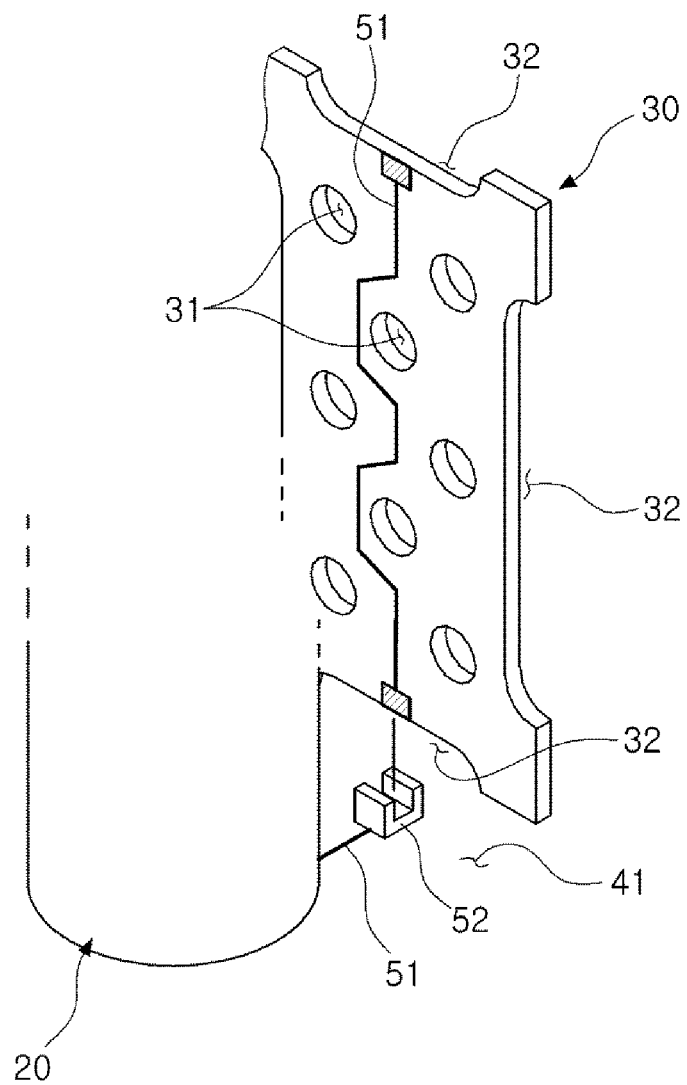
[FIG. 7B]

【FIG. 8】
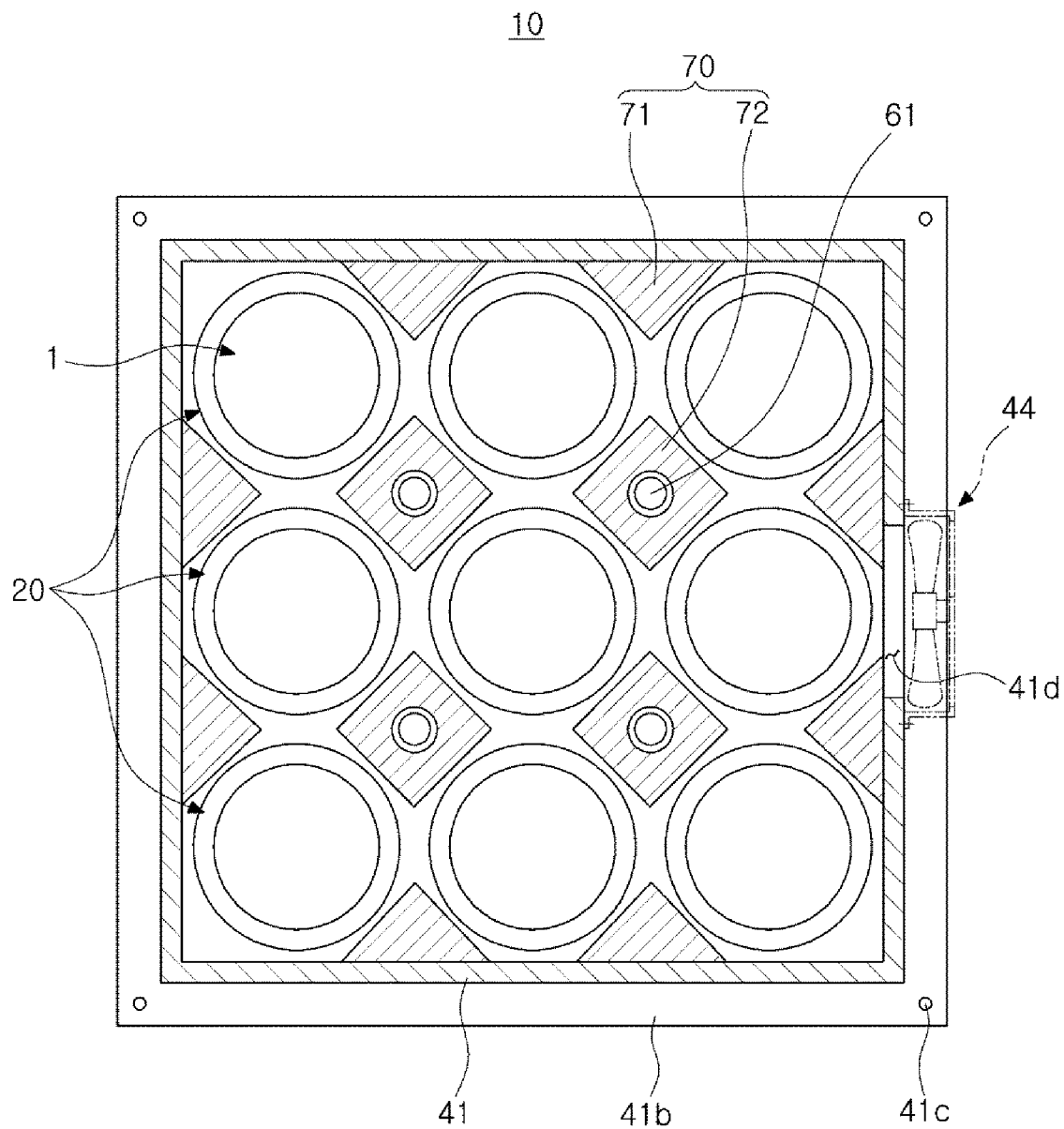

[FIG. 9]
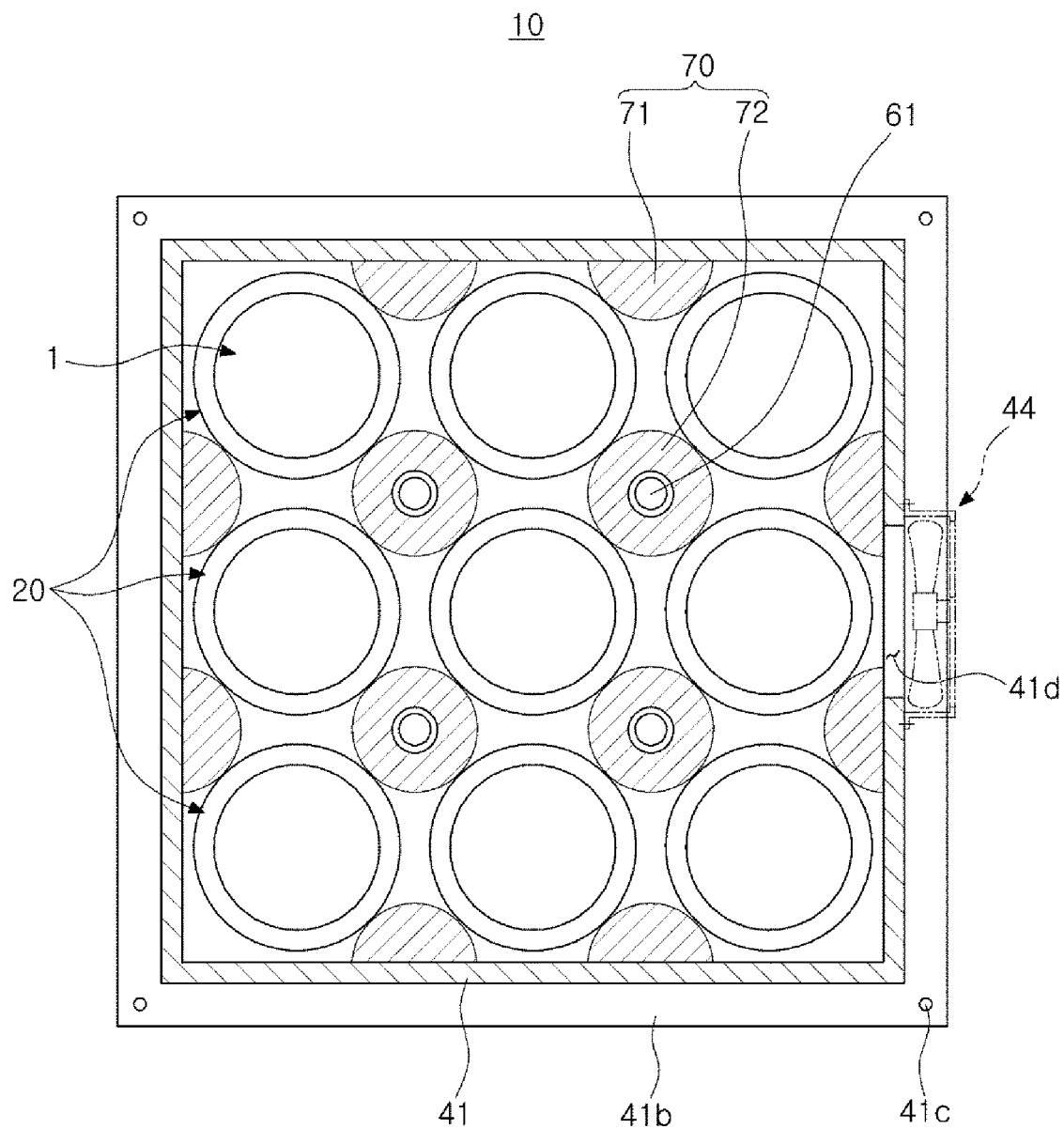

SODIUM SECONDARY BATTERY MODULE

TECHNICAL FIELD

The present disclosure relates to a secondary sodium battery module.

BACKGROUND ART

A sodium-nickel chloride (Na—NiCl2) battery is attracting attention as a secondary battery for ESS due to excellent performance thereof for main characteristics required for power storage in the ESS market, such as high stability, long life, high energy density, and the like.

This secondary battery is referred to as a unit cell, and since an electrical energy generated by one unit cell is very limited, it is inevitable to form a module having a stack structure in which several unit cells are stacked.

For module design, a unit stack must be made by stacking unit cells in a vertical direction to connect the unit cells in series, and an appropriate surface pressure structure must be provided for securing structural stability, including mechanical bonding ability of the unit cells and maintaining electrical contact between the stacked unit cells. In addition, a wiring connection technology is required to secure a desired electrical output by electrically connecting the manufactured unit stacks. In addition, it is necessary to maintain an operating temperature of the battery, and, at the same time, a temperature management technology during malfunctioning is required.

DISCLOSURE

Technical Problem

An aspect of the present disclosure is to provide a sodium secondary battery module capable of securing stability through a wiring structure implementing an automatic electrical connection for the arranged unit stacks while providing an integrated surface pressure structure for the plurality of unit stacks and temperature management.

However, the object of the present disclosure is not limited thereto, and even if not explicitly mentioned, the object or effect that can be grasped from the solutions or embodiments of the problems described below will be included therein.

Technical Solution

According to an aspect of the present disclosure, a sodium secondary battery module may include:

unit stacks in which a plurality of unit cells are laminated, each of the unit cells respectively having a solid electrolyte, a positive electrode component and a negative electrode component which have plate-shape and sealed with an upper cap and a lower cap, the positive electrode component and the negative electrode component respectively disposed on two sides of the solid electrolyte; separators which are interposed between the unit stacks while the plurality of unit stacks are arranged in columns and rows, so as to separate spaces between the unit stacks, and a case for accommodating the plurality of unit stacks and the separators.

The separators may have a plurality of ventilation holes and a plurality of ventilation slits, and the plurality of ventilation holes and the plurality of ventilation slits may partially connect a space between the separated unit stacks.

The plurality of separators may be arranged orthogonally to have a lattice-shaped dispositional structure, and the separators may overlap each other by intersecting the ventilation slits in a position in which the respective separators are orthogonal to each other.

The separator may be made of a heat insulating material.

The separator may include a line heater on a surface, facing the unit stack.

The case may include a lower case having an internal space and accommodating the plurality of unit stacks and the separator therein, an upper case covering the lower case and applying surface pressure to each of the plurality of unit stacks, and a surface pressure adjusting portion fastened in a structure penetrating through the lower case and the upper case to maintain and adjust surface pressure of the unit stacks.

The upper case may include a balancing plate on a surface, facing the unit stack in order to equalize surface pressure applied to each of the plurality of unit stacks.

The case may further include a blowing fan mounted in a through-hole formed on one surface of the lower case to cause forced convection inside the lower case.

The surface pressure adjusting portion may include a fastening bolt inserted into a fastening hole formed in the uppercase in an upper portion of the upper case, and a fastening hole formed in a protruding portion of the lower case, a fastening nut screw coupled to the fastening bolt in a lower portion of the lower case, and an elastic body interposed between the fastening bolt and the upper case.

A wiring portion provided on the case and the separator to electrically connect the plurality of unit stacks may be further included.

The wiring portion may be bonded to or coated on the case and the separator to be provided.

According to an aspect of the present disclosure, a sodium secondary battery module may include: unit stacks in which a plurality of unit cells are laminated, each of the unit cells respectively having a solid electrolyte, a positive electrode component and a negative electrode component which have plate-shape and sealed with an upper cap and a lower cap, the positive electrode component and the negative electrode component respectively disposed on two sides of the solid electrolyte; a stacking guide interposed in a space between the unit stacks to support the unit stacks in a state in which the plurality of unit stacks are spaced apart and arranged in columns and rows; and a case accommodating the unit stack and the stacking guide.

The stacking guide may have a columnar structure extending from a lower portion to an upper portion of the case, and may include a plurality of first guides provided on an inner side wall of the case and a plurality of second guides provided inside the case from the inner side wall.

The plurality of second guides may have a rod heater therein.

Advantageous Effects

According to the present disclosure, a sodium secondary battery module for securing stability through a wiring structure implementing an automatic electrical connection for the arranged unit stacks while providing an integrated surface pressure structure for the plurality of unit stacks and temperature management, may be provided.

However, various and advantageous advantages and effects of the present disclosure are not limited to the above description, and will be more readily understood in the process of describing specific embodiments of the present disclosure.

DESCRIPTION OF DRAWINGS

FIG. 1 is a cross-sectional view schematically illustrating a sodium secondary battery module according to an embodiment of the present disclosure.

FIG. 2 is an enlarged view schematically illustrating a unit stack and a unit cell constituting the sodium secondary battery module of FIG. 1.

FIG. 3 is a plan view schematically illustrating the sodium secondary battery module of FIG. 1.

FIGS. 4A and 4B are side views and perspective views schematically illustrating a separator.

FIG. 5 is a side view schematically illustrating a modified example of the separator.

FIGS. 6A and 6B are conceptual diagrams schematically illustrating a state in which a unit stack is connected by wiring units.

FIGS. 7A and 7B are perspective views schematically illustrating wirings and connectors of a wiring unit.

FIGS. 8 and 9 are plan views schematically illustrating a sodium secondary battery module according to an embodiment of the present disclosure, respectively.

MODE FOR INVENTION

Hereinafter, embodiments of the present disclosure will be described in detail with reference to the accompanying drawings. The disclosure may, however, be exemplified in many different forms and should not be construed as being limited to the specific embodiments set forth herein, and those skilled in the art and understanding the present disclosure can easily accomplish retrogressive inventions or other embodiments included in the scope of the present disclosure by the addition, modification, and removal of components within the same scope, but those are construed as being included in the scope of the present disclosure. Like reference numerals will be used to designate like components having similar functions throughout the drawings within the scope of the present disclosure.

Throughout the specification, it will be understood that when an element is referred to as being "on," "connected to," or "coupled to" another element, it can be directly "on," "connected to," or "coupled to" the other element or indirectly "on", "connected to", or "coupled to" the other elements intervening therebetween may be present. In addition, when a component is referred to as "comprise" or "comprising," it means that it may include other components as well, rather than excluding other components, unless specifically stated otherwise.

A flat plate-shaped sodium secondary battery module according to an embodiment of the present disclosure will be described with reference to FIGS. 1 to 7.

FIG. 1 is a cross-sectional view schematically illustrating a sodium secondary battery module according to an embodiment of the present disclosure, FIG. 2 is an enlarged view schematically illustrating a unit stack and a unit cell constituting the sodium secondary battery module of FIG. 1, and FIG. 3 is a plan view schematically illustrating the sodium secondary battery module of FIG. 1. FIGS. 4A and 4B are side views and perspective views schematically illustrating a separator, FIG. 5 is a side view schematically illustrating a modified example of the separator, FIGS. 6A and 6B are conceptual diagrams schematically illustrating a state in which a unit stack is connected by wiring units, and FIGS. 7A and 7B are perspective views schematically illustrating wirings and connectors of a wiring portion.

Referring to the drawings, a sodium secondary battery module 10 according to an embodiment of the present disclosure may include a unit stack 20. The unit stack 20 may be provided in plural.

The unit stacks 20 may be formed by stacking a plurality of unit cells 1 vertically in a height direction. The unit cell 1 is a flat plate-shaped sodium secondary battery, and may have a structure in which a substantially round flat plate-shaped solid electrolyte 2, and a positive electrode component 3 and a negative electrode component 4, which are flat plate-shaped, respectively disposed on two sides of the electrolyte 2 are sealed with an upper cap 5 and a lower cap 6.

The plurality of unit stacks 20 may be arranged in columns and rows. In the present embodiment, it is illustrated that the nine unit stacks 20 are arranged in 3×3 form, that is, in three columns and three rows, but the arrangement of the unit stacks is not limited thereto. For example, the number and arrangement of the unit stacks 20 may be variously changed according to the capacity of the sodium secondary battery module 1.

The number of stacked unit cells 1 constituting the unit stack 20 may be the same for respective unit stacks of the unit stacks 20.

Referring to the drawings, the sodium secondary battery module 10 according to an embodiment of the present disclosure may include a separator 30.

The separator 30 may be interposed between respective unit stacks of the unit stacks 20 in a state in which a plurality of unit stacks 20 are arranged in columns and rows. The separator 30 may separate the spaces between the unit stacks 20 by separating respective unit stacks of the unit stacks 20.

In an embodiment, the separator 30 may be configured as a plate structure having an approximately rectangular shape. The plurality of separators 30 may be arranged orthogonally to have a lattice-shaped dispositional structure.

In the present embodiment, as the plurality of unit stacks 20 are arranged in 3×3 form, it is illustrated that the separator 30 is arranged in an approximately '#' shape so that respective unit stacks of the unit stacks 20 can be separated, but it is not limited thereto.

When the temperature rises rapidly due to damage or malfunction of the unit cell 1, the separator 30 may be made of an insulating material to protect unit stacks 20, adjacent to other unit stacks 20, including the corresponding unit cell 1.

That is, the separator may separate respective unit stacks of the unit stacks 20 by the separator 30 and isolating it, thereby preventing thermal shock, physical shock, and the like from being directly applied to other general unit stacks 20 to be protected.

Therefore, it is possible to protect the sodium secondary battery module 10 by preventing a local temperature increase from spreading to the sodium secondary battery module 10 incase of an emergency, and to prevent an occurrence of damage due to explosion and fire caused by temperature rise.

In an embodiment, the separator 30 may have a plurality of ventilation holes 31 and a plurality of ventilation slits 32. The plurality of ventilation holes 31 and the plurality of ventilation slits 32 may partially connect a space between the separated unit stacks 20.

The plurality of ventilation holes 31 may be disposed in a position, facing respective unit stacks of the unit stacks 20.

The plurality of ventilation slits 32 may be disposed in a position in which respective separators of the separators 30 are orthogonal to each other, and the ventilation slits 32 of respective separators of the separators 30 may cross and overlap each other in a position in which the separators 30 are orthogonal to each other.

The plurality of ventilation holes 31 and the plurality of ventilation slits 32 can prevent internal flux flow due to forced convection, which will be described later, from impairing the temperature management function. That is, the separator 30 may protect the unit stack 20 from a rapid temperature rise, while allowing internal flux flow to be smoothly achieved by forced convection, thereby ensuring air permeability for temperature management.

Referring to FIG. 5, the separator may include a line heater on a surface facing the unit stack. For example, the line heater may include an electric heater generating heat through an electric heating wire through which current flows.

In order to operate the battery in a cooled state, it is necessary to heat the battery up to the operating temperature, and a heater (not shown) is disposed outside the case 40 to be described later and is operated, and the sodium secondary battery module 10 may be quickly heated up to the operating temperature of the battery by separately raising the temperature of the unit stack disposed therein, having the least effect by the heater through a line heater.

As described above, the line heater performing an auxiliary heating function may be selectively provided on a surface of the separator facing the unit stack disposed in the central region.

Referring to the drawings, the sodium secondary battery module 10 according to an embodiment of the present disclosure may include a case 40.

The case 40 may accommodate the plurality of unit stacks 20 and the separator 30 to support and fix the same. The case 40 may include a lower case 41, an upper case 42, and a surface pressure adjusting portion 43.

The lower case 41 may have an internal space and may accommodate a plurality of unit stacks 20 and separators 30 therein. The lower case 41 may have a substantially rectangular box-shaped structure with an upper portion thereof.

A guide plate 41a for guiding a position in which the unit stacks 20 are disposed may be provided on an inner bottom surface of the lower case 41. The guide plate 41a may be disposed corresponding to the arrangement position of the plurality of unit stacks 20. The guide plate 41a may be formed of a material having non-conductive and elastic properties.

A lower outer surface of the lower case 41 may be provided with a protrusion portion 41b to which a surface pressure adjusting unit 43 to be described later is fastened.

The upper case 42 may be coupled to the lower case 41 in a structure covering the inner space of the lower case 41. The upper case 42 may be disposed on the lower case 41 to apply surface pressure to respective unit stacks of the unit stacks 20.

The upper case 42 may be provided with a balancing plate 42a on a surface facing the unit stacks 20 in order to equalize surface pressure applied to respective unit stacks of the unit stacks 20. The balancing plate 42a may be interposed between the upper case 42 and the unit stack 20, and a problem in which the surface pressure from the upper case 42 cannot be uniformly applied through the unit stack 20 due to a difference in height between the respective unit stacks of the unit stacks 20 may be solved. The balancing plate 42a may be made of a material having non-conductivity and elastic properties.

The lower case 41 and the upper case 42 may be made of the same material, for example, may be made of a metal material. However, the materials of the lower case 41 and the upper case 42 are not limited thereto. Here, the lowercase 41 and the upper case 42 may be made of a solid material other than metal, so as to apply surface pressure to the plurality of unit stacks 20.

A surface pressure adjusting portion 43 may be fastened in a structure penetrating through the lower case 41 and the upper case 42 to maintain and adjust the surface pressure of the unit stack 20.

The surface pressure adjusting portion 43 may include a fastening bolt 43a inserted into a fastening hole 42c formed in the upper case 42 in the upper portion of the upper case 42, and a fastening hole 41c formed in the protruding portion 41b of the lower case 41, a fastening nut 43b screw coupled to the fastening bolt 43a in the lower portion of the lower case 41, and an elastic body 43c interposed between the fastening bolt 43a and the upper case 42.

The fastening bolt 43a may be inserted integrally through a fasting hole 42c of the upper case 42 and a fastening hole 41c of the lower case 41 in the upper portion of the upper case 42, and the fastening nut 43b may be screw coupled to an end portion of the fastening bolt 43a protruding from the lower portion of the lower caser 41 to fasten the upper case 42 and the lower case 41.

The elastic body 43c may be disposed between a head of the fastening bolt 43a and the upper case 42, and may generate elastic force as the fastening bolt 43a and the fastening nut 43b are tightened so that the upper case 42 may press the unit stack 20. The elastic body 43c may be, for example, an elastic spring.

The operator may adjust and maintain the surface pressure of the unit stack 20 by adjusting the elastic force of the elastic body 43c by tightening or loosening the fastening bolt 43a and the fastening nut 43b.

In an embodiment, a blowing fan 44 may be mounted on the case 40 for internal temperature management. The blowing fan 44 may be mounted on an outside of the corresponding one surface to cover a through-hole 41d formed on one surface of the lower case 41.

The blowing fan 44 may cause forced convection inside the lower case 41. For example, when a temperature change occurs, such as an increase in the temperature inside the case 40 according to a charging/discharging operation, the blowing fan 44 may generate forced convection to perform temperature management through the internal flux flow. For example, the blowing fan 44 may discharge heated air inside the case 40 externally through the through-hole 41d, or may allow external air to flow into the inside the sodium secondary battery module 10, such that the temperature management for the sodium secondary battery module 10 may be performed.

In particular, the internal flux flow may be blocked or may not be smoothly performed by the separator 30 installed to separate spaces between the plurality of unit stacks 20 inside the case 40, but in the present disclosure, since the plurality of ventilation holes 31 and the plurality of ventilation slits formed in the separator 30 have a structure partially connecting the spaces between the separated unit stack 20, it is possible to secure air permeability, so that the forced convection ability may not be reduced and smooth internal flux flow may be maintained.

Referring to the drawings, the sodium secondary battery module 10 according to an embodiment of the present disclosure may include a wiring portion 50.

The wiring portion 50 may be provided on the case 40 and the separator 30 to electrically connect the plurality of unit stacks 20. The wiring portion 50 may be bonded to or coated on the surfaces of the case 40 and the separator 30 to be provided.

The wiring portion 50 may include a connector 52 connecting a wiring 51 provided on inner surfaces of the lower case 41 and the upper case 42, a wiring 51 provided on the upper case 42 when the upper case 42 and the lower case 41 are bonded, and a wiring 51 provided on the lower case 41.

The wiring 51 may be exposed through the balancing plate 42a on the surface of the upper case 42, and may be connected to the unit cell 1 disposed on the uppermost portion of the unit stack 20 when the upper case 42 presses the unit stack 20.

In addition, the wiring 51 may extend to a bottom surface along a sidewall of the lower case 41 and may be exposed through the guide plate 41a, or a portion thereof may be exposed through the guide plate 41a on the bottom, and as the unit stack 20 is disposed on the guide plate 41a, the wiring 51 may be connected to the unit cell 1 disposed on the lowermost portion of the unit stack 20.

In addition, the wiring 51 may be provided in a structure extending from a surface of the separator 30 along a height direction of the separator 30.

The connector 52 may be respectively provided corresponding to a position in which the upper case 42 and the lower case 41 are bonded to each other and a position of the separator 30. For example, it may be provided on an upper inner side surface of the lower case 41 and an edge of inner side surface of the upper case 42 so that when the upper case 42 is disposed on the lower case 41, it may be provided in a mutually bonded structure. In addition, it may be respectively provided in a position in which the separator 30 is disposed among bottom surfaces of the lower case 41 and a position, in contact with the separator 30 among the surface of the upper case 42 to be provided in a structure that is respectively bonded to the separator 30. As shown in the drawings, a wiring portion 50 may have a wiring structure connecting the unit cell 1 disposed on the uppermost portion of the unit stack 20 and the unit cell 1 on the lowermost portion of the adjacent other unit stacks 20. Accordingly, the plurality of unit stacks 20 may be connected in series by the wiring portion 50.

As described above, in the present embodiment, in a state in which the wiring portion 50 is previously installed on the surfaces of the case 40 and the separator 30 through bonding or coating, a plurality of unit stacks 20 may be disposed and the upper case 42 may be bonded to the lower case 41, so that a wiring structure in which the plurality of unit stacks 20 are automatically connected may be simply implemented. Therefore, in the method of connecting through soldering using a conventional wire, a problem in which a short circuit occurs may be solved, and there is an effect of shortening the process time of manufacturing the module.

A flat plate-shaped sodium secondary battery module according to an embodiment of the present disclosure will be described with reference to FIGS. 8 and 9. FIGS. 8 and 9 are plan views schematically illustrating a sodium secondary battery module according to an embodiment of the present disclosure, respectively.

A flat plate-shaped sodium secondary battery module 10 according to the embodiment disclosed in FIGS. 8 and 9 has substantially the same configuration and structure as the sodium secondary battery module 10 according to the embodiment disclosed in FIGS. 1 to 7.

However, since there is a difference in that a separator 30 is omitted and a stacking guide 70 is provided instead, the stacking guide 70 will be mainly described below.

Referring to the drawings, the stacking guide 70 may be interposed in a space between the unit stacks 20 in a state in which a plurality of unit stacks 20 are spaced apart from each other and arranged in columns and rows.

The stacking guide 70 may separate and support the unit stack 20 disposed in the case 40. That is, the stacking guide 70 may serve to support the plurality of unit stacks 20 until it covers an upper case 42 after the plurality of unit stacks 20 are disposed.

For example, it is possible to prevent the position of the unit stack 20 from being shifted due to an external impact, coming into contact with another adjacent unit stack 20, or falling over. In addition, the stacking guide 70 may serve to guide a position in which the unit stack 20 is disposed.

In one embodiment, the stacking guide 70 may have a columnar structure extending from a lower portion of the case 40 toward an upper portion in parallel with the unit stack 20.

As shown in FIG. 8, the stacking guide 70 may have a polygonal shape such as a triangle or a square in cross-section. In addition, it is possible to have a structure having a semicircle or circular cross-section as shown in FIG. 9.

The stacking guide 70 may be provided as a structure spaced apart from respective unit stacks of the unit stacks 20 at a predetermined interval as shown in FIG. 8. In addition, as shown in FIG. 9, it may also be provided as a structure in contact with respective unit stacks of the unit stacks 20.

In one embodiment, the stacking guide 70 may be made of a non-conductive material.

The stacking guide 70 may include a plurality of first guides 71 provided on an inner side wall of the case 40 and a plurality of second guides 72 provided inside the case 40 from the inner side wall.

As the plurality of unit stacks 20 are spaced apart and arranged in columns and rows, the plurality of first guides 71 and plurality of second guides 72 may also be spaced apart from each other and arranged in columns and rows. In this way, the plurality of stacking guides 70 may be arranged to be spaced apart, so that internal flux flow by forced convection through the space between the stacking guides 70 can be smoothly achieved, thereby ensuring ventilation for temperature management.

Meanwhile, the plurality of second guides 72 may have a rod heater 61 therein. The rod heater may include an electric heater generating heat through an electric heating wire through which an electric current flows.

Like the line heater 60 provided to the separator 30, the rod heater 61 may perform an auxiliary heating function to increase the temperature of the unit stack 20 disposed inside the case 40 having the least effect of a heater (not shown) disposed outside the case 40. Accordingly, the sodium secondary battery module 10 can be rapidly heated up to an operating temperature of the battery.

While example embodiments have been shown and described above, it will be apparent to those skilled in the art that modifications and variations could be made without departing from the scope of the present inventive concept as defined by the appended claims.

The invention claimed is:

1. A sodium secondary battery module, comprising:
   unit stacks in which a plurality of unit cells are laminated, each of the unit cells respectively having a solid electrolyte, a positive electrode component and a negative electrode component which have plate-shape and sealed with an upper cap and a lower cap, the positive electrode component and the negative electrode component respectively disposed on two sides of the solid electrolyte;

separators which are interposed between the unit stacks while the plurality of unit stacks are arranged in columns and rows, so as to separate spaces between the unit stacks; and a case for accommodating the plurality of unit stacks and the separators, wherein the case comprises a lower case having an internal space and accommodating the plurality of unit stacks and the separator therein, an upper case covering the lower case and applying surface pressure to each of the plurality of unit stacks, and a surface pressure adjusting portion fastened in a structure penetrating through the lower case and the upper case to maintain and adjust the surface pressure of the unit stacks, the surface pressure adjusting portion comprises a fastening bolt inserted into a fastening hole formed in the upper case in an upper portion of the upper case and a fastening hole formed in a protruding portion of the lower case, a fastening nut screw coupled to the fastening bolt in a lower portion of the lower case, and an elastic body interposed between the fastening bolt and the upper case, the upper case includes a balancing plate on a surface, facing the unit stack in order to equalize the surface pressure, applied to each of the plurality of unit stacks, and the balancing plate is made of a material having elastic properties.

2. The sodium secondary battery module of claim 1, wherein the separator has a plurality of ventilation holes and a plurality of ventilation slits, wherein the plurality of ventilation holes and the plurality of ventilation slits partially connect the spaces between separated the unit stacks.

3. The sodium secondary battery module of claim 2, wherein the plurality of separators are arranged orthogonally to have a lattice-shape dispositional structure, and overlap each other by intersecting the ventilation slits in a position in which the respective separators are orthogonal to each other.

4. The sodium secondary battery module of claim 1, wherein the separator is made of a heat insulating material.

5. The sodium secondary battery module of claim 1, wherein the separator includes a line heater on a surface, facing the unit stack.

6. The sodium secondary battery module of claim 1, wherein the case further comprises a blowing fan mounted in a through-hole formed on one surface of the lower case to cause forced convection inside the lower case.

7. The sodium secondary battery module of claim 1, further comprising a wiring portion provided on the case and the separator to electrically connect the plurality of unit stacks.

8. The sodium secondary battery module of claim 7, wherein the wiring portion is bonded to or coated on the case and the separator to be provided.

9. A sodium secondary battery module, comprising:

unit stacks in which a plurality of unit cells are laminated, each of the unit cells respectively having a solid electrolyte, a positive electrode component and a negative electrode component which have plate-shape and sealed with an upper cap and a lower cap, the positive electrode component and the negative electrode component respectively disposed on two sides of the solid electrolyte;

a stacking guide interposed in a space between the unit stacks to support the unit stacks in a state in which the plurality of unit stacks are spaced apart and arranged in columns and rows; and a case for accommodating the unit stack and the stacking guide, wherein the case comprises a lower case having an internal space and accommodating the plurality of unit stacks and the separator therein, an upper case covering the lower case and applying surface pressure to each of the plurality of unit stacks, and a surface pressure adjusting portion fastened in a structure penetrating through the lower case and the upper case to maintain and adjust the surface pressure of the unit stack, the surface pressure adjusting portion comprises a fastening bolt inserted into a fastening hole formed in the upper case in an upper portion of the upper case and a fastening hole formed in a protruding portion of the lower case, a fastening nut screw coupled to the fastening bolt in a lower portion of the lower case, and an elastic body interposed between the fastening bolt and the upper case, the upper case includes a balancing plate on a surface, facing the unit stack in order to equalize the surface pressure, applied to each of the plurality of unit stacks, and the balancing plate is made of a material having elastic properties.

10. The sodium secondary battery module of claim 9, wherein the stacking guide has a structure having a columnar shape extending from a lower portion of the case toward an upper portion thereof, and the stacking guide comprises a plurality of first guides provided on an inner side wall of the case and a plurality of second guides provided inside the case from the inner side wall.

11. The sodium secondary battery module of claim 10, wherein the plurality of second guides have a rod heater therein.

* * * * *